Feb. 13, 1962 W. McKINLAY 3,021,029
VENT TUBE AND CAP ASSEMBLY
Filed Jan. 21, 1959
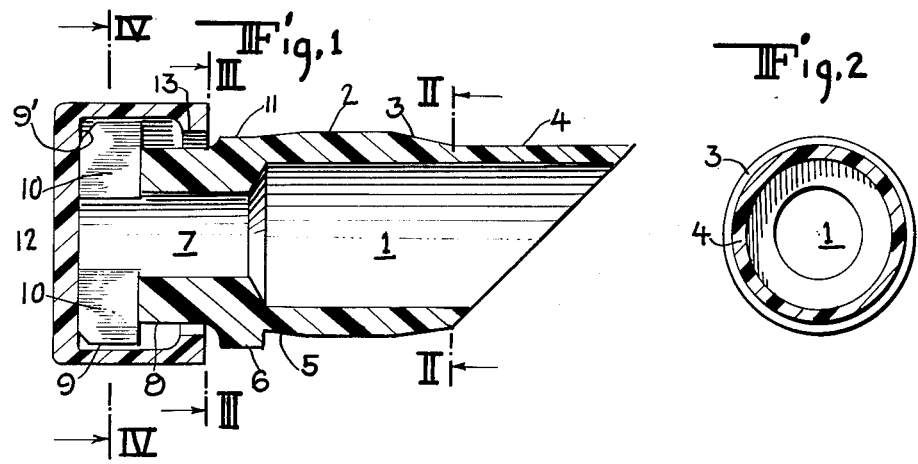
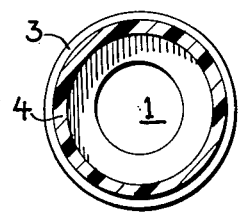
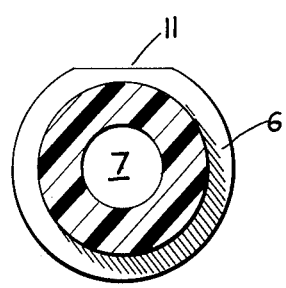
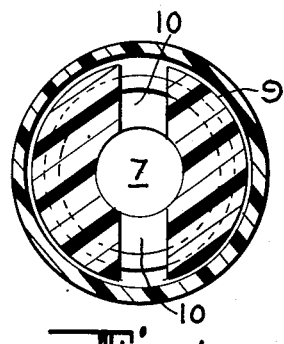
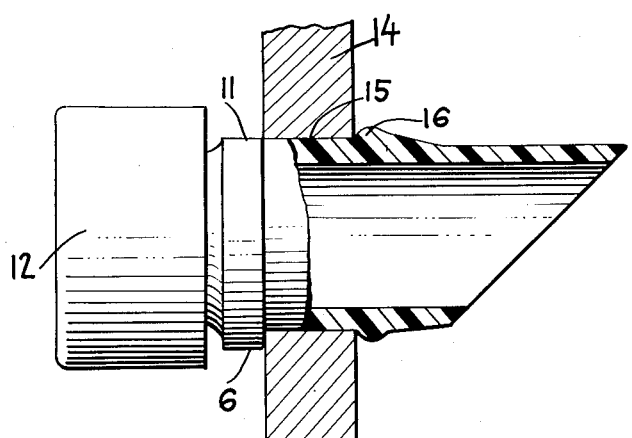
INVENTOR
William McKinlay
BY
Brown & Seward
ATTORNEYS

United States Patent Office 3,021,029
Patented Feb. 13, 1962

3,021,029
VENT TUBE AND CAP ASSEMBLY
William McKinlay, Sodus, N.Y., assignor to The Danielson Manufacturing Company, Danielson, Conn., a corporation of Rhode Island
Filed Jan. 21, 1959, Ser. No. 788,173
1 Claim. (Cl. 220—44)

This invention relates to a vent tube and cap assembly, intended for use in connection with the rear axle housing of an automobile or with any other structure having similar requirements.

An automobile rear axle housing and its contents are subjected to wide variations in temperature both from external causes such as weather conditions and from internal causes such as frictional heat developed during operation of the vehicle at varying speeds. Since the housing contains some air in addition to grease and oil it is important to provide a vent for equalization of internal and external air pressure in the course of temperature changes. Such a vent must naturally be capped in order to exclude dust and the like.

It is an object of the present invention to provide a molded nylon vent tube and plastic cap assembly which will function as well as presently known steel vents while being less expensive than steel and easier to install.

A practical embodiment of the invention is shown in the accompanying drawing, wherein:

FIG. 1 represents an axial sectional view of the vent plug and cap;

FIG. 2 represents a transverse (radial) section on the line II—II of FIG. 1, looking in the direction of the arrows, the cap being omitted;

FIG. 3 represents a transverse section on the line III—III of FIG. 1, looking in the direction of the arrows;

FIG. 4 represents a transverse section on the line IV—IV of FIG. 1, looking in the direction of the arrows; and FIG. 5 represents an elevation, partly in axial section, showing the vent tube installed in the wall of a compartment such as an axle housing.

Referring to the drawings, the vent tube is shown as being a generally cylindrical body, the inner half having a large cylindrical bore 1 within a wall which has a cylindrical zone 2 of maximum diameter, an inwardly tapering zone 3, a diagonally truncated cylindrical inner zone 4 of minimum diameter and a short outwardly tapered zone 5 which terminates approximately opposite the outer end of the bore 1 at the inner face of a radially projecting flange 6. The outer half of the tube has a smaller cylindrical bore 7, extending from the bore 1 to the outer end of the tube, within a wall which is thickened to form the flange 6, with a cylindrical intermediate zone 8 and an enlarged head portion 9 of almost the same diameter as the flange 6. The head 9 is traversed by diametrically opposed radial passages 10, 10, each having a width somewhat less than the diameter of the bore 7 with which they communicate. The flange 6 is basically annular but its continuity is wholly or partially interrupted at one point by the provision of a flattened part 11, preferably alined with the innermost projection of the truncated zone 4; the part 11 thus serves to indicate the position of the tube when installed as well as providing a surface to be engaged by an ordinary wrench if the tube should need to be turned.

The cap 12 has an interior diameter slightly greater than the diameter of the head portion 9, except that the radially inwardly projecting flange 13 of the cap has a diameter less than that of said head. The cap must therefore be forced into place, with some compression of the head portion (preferably beveled at 9'), so that it snaps into its assembled position where it fits loosely on the head and also has some looseness between the flange 13 and the zone 8 of the tube. The tube is preferably of molded nylon while the cap may be of a linear polyethylene plastic such as "Marlex."

In order to install the vent plug and cap assembly in its working position, a wall 14 of a compartment such as an axle housing for the rear axle of an automobile, is provided with a hole 15, drilled (or cast) but not threaded. The truncated inner end 4 of the tube, which is smaller than the hole 15, is inserted therein and the tube is then driven home to the position shown in FIG. 5. The smallest tolerance for the diameter of the zone 2 is larger than the largest tolerance for the diameter of the hole 15, so that the tube must always be radially compressed, providing a strong interference fit due to the resistance of the nylon to such compression.

While nylon is an economical and generally desirable material for use as described above, it has a high coefficient of thermal expansion and is also subject to creep, particularly as a result of heating by hot oil in the axle housing. When the oil, after becoming heated in use, is allowed to cool off the nylon tube tends to shrink more than the metal around it and thus becomes dangerously loose. This tendency is taken care of by the special formation of the tube as shown and described herein. Upon the initial expansion of the tube under heat the nylon creeps from the hole 15, where it is rigdly confined, to the unconfined zone 16 (the inner part of the zone 2) where it builds up into a noticeable annular bulge immediately adjacent to the hole. This bulge remains after cooling and effectively holds the tube in place regardless of the looseness of the tube within the hole. Since the bulge starts at the very edge of the hole, it likewise seals the line of contact between the tube and the housing in such a way as to prevent or minimize spilling or leakage (the pressure differential between the inside and outside of the housing being, obviously, substantially zero).

A nylon vent tube not designed nor able to form such a locking bulge rapidly gets loose and falls out; the tube shown and described herein cannot fall out but serves its purpose satisfactorily as long as necessary, while being less expensive to make and install than the steel vent tube and cap assemblies heretofore known.

What I claim is:

A vent tube and cap assembly designed to fit in a hole in a housing, comprising a tubular body of nylon having an inner portion of smaller diameter than said hole, a housing-engaging portion of larger diameter than said hole, an intermediate portion tapering inwardly from said larger portion to said smaller portion, and an outwardly projecting end portion terminating in an enlarged and radially slotted head, and a radially inwardly flanged cap snap-fitted over said head.

References Cited in the file of this patent

UNITED STATES PATENTS

| | | |
|---|---|---|
| 2,216,125 | Martino | Oct. 1, 1940 |
| 2,766,408 | Georgiev | Oct. 9, 1956 |
| 2,784,865 | Rieke | Mar. 12, 1957 |
| 2,786,090 | Wells | Mar. 19, 1957 |